(12) United States Patent
Paulus et al.

(10) Patent No.: US 11,229,950 B2
(45) Date of Patent: Jan. 25, 2022

(54) SYSTEMS, DEVICES AND METHODS FOR SPARK PLASMA SINTERING

(71) Applicant: Mikro Systems, Inc., Charlottesville, VA (US)

(72) Inventors: John R. Paulus, Afton, VA (US); Jon T. Moore, Charlottesville, VA (US); Benjamin E. Heneveld, Newmarket, NH (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 518 days.

(21) Appl. No.: 15/959,617

(22) Filed: Apr. 23, 2018

(65) Prior Publication Data
US 2018/0304362 A1 Oct. 25, 2018

Related U.S. Application Data

(60) Provisional application No. 62/488,218, filed on Apr. 21, 2017.

(51) Int. Cl.
*B22F 3/105* (2006.01)
*B22F 5/10* (2006.01)
(Continued)

(52) U.S. Cl.
CPC ............... *B22F 3/03* (2013.01); *B22F 3/105* (2013.01); *B22F 7/06* (2013.01); *B22F 7/08* (2013.01); *B22F 5/04* (2013.01); *B22F 2003/1046* (2013.01); *B22F 2003/1051* (2013.01); *B22F 2003/244* (2013.01); *B22F 2003/247* (2013.01); *B22F 2003/248* (2013.01); *B22F 2005/103* (2013.01); *B22F 2998/10* (2013.01);
(Continued)

(58) Field of Classification Search
CPC ..... B28B 23/0068; B29C 33/02; B29C 43/18; B29C 64/295; C04B 2235/666; B22F 3/03; B22F 2003/1051; B22F 5/10; B22F 2005/103; B22F 7/06; B22F 7/08; B22F 3/105
See application file for complete search history.

(56) References Cited

U.S. PATENT DOCUMENTS 3,219,731 A 11/1965 Etzel et al.
3,969,124 A 7/1976 Stewart
(Continued)

FOREIGN PATENT DOCUMENTS

DE 102006018690 A1 10/2007
EP 0090118 A1 10/1983
(Continued)

OTHER PUBLICATIONS

JP2893829B English translation (Year: 1999).*
(Continued)

*Primary Examiner* — Anthony J Zimmer
*Assistant Examiner* — Sean P. O'Keefe
(74) *Attorney, Agent, or Firm* — Cantor Colburn LLP

(57) ABSTRACT

A method of forming an article including: contacting a fugitive tool with a powdered parent material; densifying the powdered material; and destructively removing the fugitive tool. A coating of a different material may be formed against the parent material using a similar approach.

11 Claims, 6 Drawing Sheets

(51) Int. Cl.
| | |
|---|---|
| *B22F 3/03* | (2006.01) |
| *B22F 7/06* | (2006.01) |
| *B22F 7/08* | (2006.01) |
| *B22F 3/24* | (2006.01) |
| *B22F 5/04* | (2006.01) |
| *B28B 23/00* | (2006.01) |
| *B29C 43/18* | (2006.01) |
| *B22F 3/10* | (2006.01) |

(52) U.S. Cl.
CPC ....... *B22F 2999/00* (2013.01); *B28B 23/0068* (2013.01); *B29C 43/18* (2013.01); *C04B 2235/666* (2013.01)

(56) References Cited

U.S. PATENT DOCUMENTS

| | | | |
|---|---|---|---|
| 4,180,211 A | 12/1979 | Olcott et al. | |
| 4,745,008 A | 5/1988 | Plotzker et al. | |
| 4,917,960 A * | 4/1990 | Hornberger | C09D 1/00 |
| | | | 428/550 |
| 5,248,705 A | 9/1993 | Mcguigan et al. | |
| 5,935,359 A | 8/1999 | Sohda et al. | |
| 5,993,905 A | 11/1999 | Sheehan | |
| 6,384,365 B1 * | 5/2002 | Seth | B23K 10/00 |
| | | | 219/76.13 |
| 7,628,942 B1 | 12/2009 | Miller et al. | |
| 7,799,715 B2 | 9/2010 | Hirota et al. | |
| 8,871,141 B2 | 10/2014 | Reau et al. | |
| 2003/0087095 A1 | 5/2003 | Lewis et al. | |
| 2004/0126266 A1 * | 7/2004 | Jackson | C22C 29/18 |
| | | | 419/66 |
| 2005/0214156 A1 | 9/2005 | Troitsk et al. | |
| 2008/0073127 A1 * | 3/2008 | Zhan | E21B 10/46 |
| | | | 175/434 |
| 2008/0115358 A1 * | 5/2008 | Rice | B22F 3/15 |
| | | | 29/889.21 |
| 2010/0294571 A1 * | 11/2010 | Belnap | E21B 10/567 |
| | | | 175/434 |
| 2011/0268599 A1 | 11/2011 | Liufu et al. | |
| 2013/0101455 A1 | 4/2013 | Tofail et al. | |
| 2013/0285778 A1 * | 10/2013 | Taihaku | H01F 1/0536 |
| | | | 335/302 |
| 2013/0344349 A1 | 12/2013 | Hugot et al. | |
| 2014/0026776 A1 * | 1/2014 | Kecskes | C22C 45/001 |
| | | | 102/305 |
| 2014/0145808 A1 * | 5/2014 | Kume | H01F 1/0577 |
| | | | 335/302 |
| 2014/0373679 A1 * | 12/2014 | Heidloff | B22F 1/02 |
| | | | 75/235 |
| 2015/0078958 A1 * | 3/2015 | Bewlay | B22C 9/04 |
| | | | 420/417 |
| 2015/0252451 A1 | 9/2015 | Al-Aqeeli et al. | |
| 2015/0329431 A1 * | 11/2015 | Deville | C04B 35/52 |
| | | | 428/188 |
| 2016/0121400 A1 | 5/2016 | Couret et al. | |
| 2016/0133402 A1 | 5/2016 | Pohle et al. | |
| 2016/0168660 A1 * | 6/2016 | Kim | B22F 3/15 |
| | | | 252/62.55 |
| 2017/0129816 A1 * | 5/2017 | Deville | C04B 35/6263 |
| 2018/0265963 A1 * | 9/2018 | Hasegawa | C22C 33/0278 |
| 2018/0318931 A1 * | 11/2018 | Estournes | B22F 5/003 |

FOREIGN PATENT DOCUMENTS

| | | | | |
|---|---|---|---|---|
| EP | 2832708 A1 | 2/2015 | | |
| JP | 2893829 B2 | 5/1999 | | |
| JP | 2010168610 A | 8/2010 | | |
| WO | WO-2014202389 A1 * | 12/2014 | ............ | B22F 3/1003 |
| WO | WO-2015144665 A1 * | 10/2015 | ............ | B22F 3/1291 |

OTHER PUBLICATIONS

WO-2014202389-A1 English translation (Year: 2014).*
Extended European Search Report for European Application No. 18168840.9 dated Jan. 24, 2019, 13 pages.
Charles Maniere: "V.4.3 Approche par la methode d'interfaces mobiles", Spark Plasma Sintering: couplage entre les approches Modelisation, Instrumentation et Materiaux (Ph.D. Thesis), Apr. 8, 2016 (Apr. 8, 2016), pp. 175-188, XP055499753, Retrieved from the Internet: URL:http://theseups.ups-tsle.fr/2948/ [retrieved on Aug. 14, 2018].
European Search Report for European Application No. 18168840.9 dated Aug. 28, 2018, 12 pages.
European Examination Report for European Application No. 18168840.9, Application Filing Date Apr. 23, 2018 ; dated Mar. 26, 2020; 5 pages.
Xu, et al., "Comparison of sizing small particles using different technologies", Powder Technology 132 (2003) pp. 145-153.
Eitel, et al., "A Hitchhiker's Guide to Particle Sizing Techniques", Langmuir 2020, 36, pp. 10307-10320.
European Office Action for European Application No. 18168840.9; Application Filing Date: Apr. 23, 2018; dated Mar. 22, 2021; 9 pages.

* cited by examiner

SYSTEMS, DEVICES AND METHODS FOR SPARK PLASMA SINTERING

CROSS REFERENCE TO RELATED APPLICATIONS

This application claims the benefit of U.S. Provisional Application No. 62/488,218, filed Apr. 21, 2017, which is incorporated by reference herein in its entirety.

BACKGROUND

Exemplary embodiments pertain to the fabrication of articles by powder densification. In particular, exemplary embodiments pertain to spark plasma sintering.

Spark plasma sintering (SPS), also known as field assisted sintering technique (FAST) or pulsed electric current sintering (PECS), is a powder densification technique. The main characteristic of SPS is that the pulsed or unpulsed DC or AC current directly passes through a graphite die, as well as the powder compact, in case of conductive samples. Joule heating has been found to play a dominant role in the densification of powder compacts, which results in achieving near theoretical density at lower sintering temperature compared to conventional sintering techniques. The heat generation is internal, in contrast to the conventional hot pressing, where the heat is provided by external heating elements. This facilitates a very high heating or cooling rate (up to 1000 K/min), hence the sintering process generally is very fast (within a few minutes).

BRIEF DESCRIPTION

Disclosed is a method of forming an article including: contacting a fugitive tool with a powdered parent material; densifying the powdered material; and destructively removing the fugitive tool.

In addition to one or more of the features described above, or as an alternative to any of the foregoing embodiments the fugitive tool is embedded in the powdered parent material.

In addition to one or more of the features described above, or as an alternative to any of the foregoing embodiments, the method further includes placing the fugitive tool in contact with a non-fugitive tool.

In addition to one or more of the features described above, or as an alternative to any of the foregoing embodiments, densifying employs spark plasma sintering (SPS).

In addition to one or more of the features described above, or as an alternative to any of the foregoing embodiments, the parent material has nanoscale morphology.

In addition to one or more of the features described above, or as an alternative to any of the foregoing embodiments, the fugitive tool is porous and destructively removing the tool includes crushing the fugitive tool during cooling.

In addition to one or more of the features described above, or as an alternative to any of the foregoing embodiments, destructively removing the tool includes burning in air or leaching.

Also disclosed is a method of forming a coating including applying a coating material to a fugitive tool; placing powdered parent material in contact with the coating material on the fugitive tool; densifying the powdered parent material and destructively removing the fugitive tool.

In addition to one or more of the features described above, or as an alternative to any of the foregoing embodiments the fugitive tool is embedded in the powdered parent material.

In addition to one or more of the features described above, or as an alternative to any of the foregoing embodiments, the method further includes placing the fugitive tool in contact with a non-fugitive tool.

In addition to one or more of the features described above, or as an alternative to any of the foregoing embodiments, densifying employs spark plasma sintering (SPS).

In addition to one or more of the features described above, or as an alternative to any of the foregoing embodiments, the parent material has nanoscale morphology.

In addition to one or more of the features described above, or as an alternative to any of the foregoing embodiments, the coating imparts reactivity to the surface of the densified parent material.

Also disclosed is a method of locating an interior component including contacting a component with a fugitive tool; placing the fugitive tool in a non-fugitive tool; placing powdered parent material in contact with the fugitive tool; densifying the powdered parent material and destructively removing the fugitive tool.

In addition to one or more of the features described above, or as an alternative to any of the foregoing embodiments the fugitive tool is embedded in the powdered parent material.

In addition to one or more of the features described above, or as an alternative to any of the foregoing embodiments, the method further includes placing the fugitive tool in contact with a non-fugitive tool.

In addition to one or more of the features described above, or as an alternative to any of the foregoing embodiments, densifying employs spark plasma sintering (SPS).

In addition to one or more of the features described above, or as an alternative to any of the foregoing embodiments, the parent material has nanoscale morphology.

In addition to one or more of the features described above, or as an alternative to any of the foregoing embodiments, the fugitive tool is porous and destructively removing the tool includes crushing the fugitive tool during cooling.

In addition to one or more of the features described above, or as an alternative to any of the foregoing embodiments, destructively removing the tool includes burning in air or leaching.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
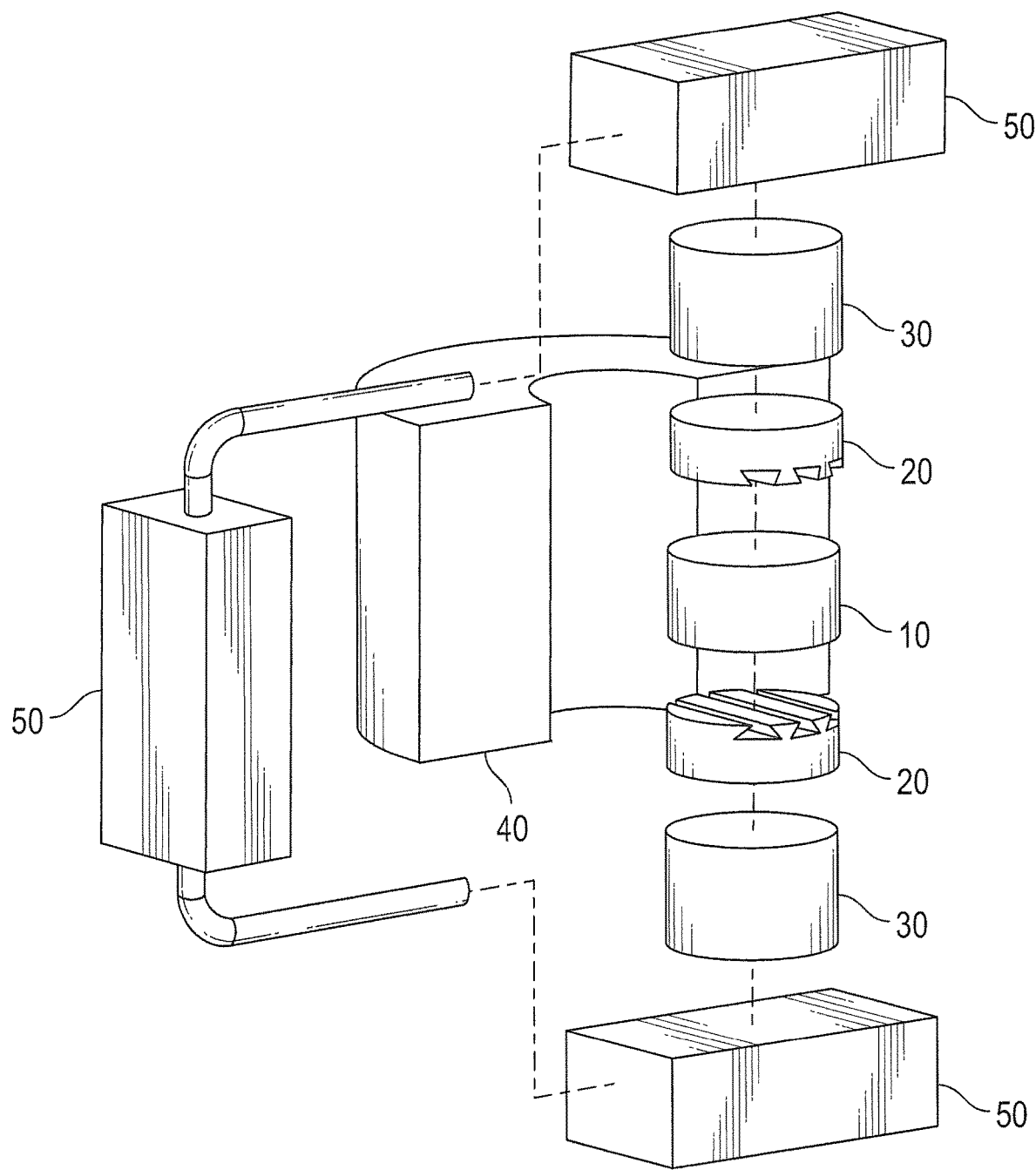
FIG. 1 is an exploded view of a densification apparatus using a fugitive tool.

A detailed description of one or more embodiments of the disclosed apparatus and method are presented herein by way of exemplification and not limitation with reference to the Figures.

SPS offers the opportunity to densify many powdered and/or fibrous forms of materials and/or combinations of materials that have no other effective means of production. SPS can densify a wide range of powders more quickly and effectively than any other process, but it is limited in the shapes it can make. In particular, it is difficult to make shapes having interior cavities or complicated exterior features. Described herein are methods that employ fugitive materials to form destructively removable tools for forming more intricate shapes via SPS. With a tool system that is removed destructively, both complex exterior shapes and interior cavities are possible.

As used herein, the term "fugitive material" refers to material which can be destructively removed without harming the article. Exemplary methods of destructive removal including burning and leaching. For example, graphite can be removed by burning and silica can be removed by leaching. Fugitive tools are made of fugitive material.

SPS utilizes a non-fugitive punch and die system where the material being densified (the "parent" material) can conform and/or adhere to the non-fugitive tool. A liner of graphite paper can be used between the non-fugitive tool and the parent material to allow the part to be released after densification. Alternatively, a slip layer can be created between the tool and parent material. The graphite paper and slip layer are not always effective as release layers, particularly for more complex shapes. Even if an effective and accurate slip layer can be devised for a complex form, the non-fugitive tool can be easily abraded and/or can have a short life span before the tool wear affects the target part dimensions. Further, pull planes can be a limitation in any hard fixed reusable tool set.

The use of a pre-fabricated disposable, destructively removable, fugitive tool, which can be used inside a standard non-fugitive tool, can solve one or more of these problems. The parent material can be pressed into the fugitive tool, which can be removed from the non-fugitive tool with the part, and the fugitive tool can be destructively removed afterwards to release the final part. It is also contemplated that the fugitive tool can be destructively removed prior to removal from the non-fugitive tool, facilitating release of the part from the non-fugitive tool. This approach can allow a large degree of freedom of design for the surface of a part made by SPS. The fugitive tool can be disposed on any portion of the non-fugitive tool. For example, the fugitive tool may be disposed on the entire contact surface of the non-fugitive tool or may be disposed on only a portion of the contact surface of the non-fugitive tool. The use of fugitive tools can also allow for greater adaptability of the non-fugitive tool by permitting easy modification of the shapes to be produced without the need to completely redesign and produce the non-fugitive tool.

The fugitive tool also can be used to create complex inner cavities by locating and burying the fugitive tool in the powder bed within the non-fugitive tool and processing it inside the part. The fugitive tool can then be removed destructively. It is also contemplated that a fugitive tool can be used to locate a previously made component into the part being formed in the non-fugitive tool. The previously made component is located in or on the fugitive tool and the fugitive tool/component combination is located in the parent material in the non-fugitive tool. The material is densified and then the fugitive tool is destructively removed, leaving the component in the desired location. In some embodiments, the densification of the parent material can result in bonding with the previously made component.

It is further contemplated that a fugitive tool can be used to apply a coating of a different material to one or more exterior surfaces and/or interior surfaces during formation of a part. One or more surfaces of the fugitive tool can be coated, such as by vapor deposition, spray deposition, dip coating, and/or brushing, etc., with another material prior to densification of the parent material. During processing, the coating material bonds to the parent material. When the fugitive form is removed, the coating material remains bonded to the produced part. A variety of coatings are contemplated including protective coatings and coatings which impart reactivity to a surface such as catalytic reactivity.

The fugitive tool is constructed to be compatible with the parent material. For example, the porosity of the fugitive tool is chosen to allow for contraction of the parent material during cooling. The fugitive tool may be crushed during cooling of the part if needed so as to not damage the parent material during large thermal changes. Additionally, the method of destructive removal is chosen to be compatible with the parent material. For example, if the fugitive material is to be removed by burning then the temperature of burning should not exceed the melting point or oxidation temperature of the parent material. In some embodiments the burning temperature is less than the temperature required to alter the microstructure of the densified parent material. If the fugitive material is to be removed by leaching then the leachant should be chosen to have little or no impact on the densified parent material.

It may be desirable that the relative coefficient of thermal expansion (CTE) of the fugitive material matches that of the parent material as closely as possible. But an exact match is not needed if the fugitive tool can and/or should be crushed by the parent material during shrinking of the parent material as it cools. If the fugitive material's CTE closely matches the parent material's CTE, the fugitive tool can be stronger and/or more dense. If the fugitive material's CTE mismatches that of the parent material, the fugitive tool can be crushable, have a high porosity or both to allow the parent material to shrink against the fugitive during cooling without damaging and/or distorting the parent material.

The crushability of the fugitive tool can be determined by the inherent strength of the material, its porosity, or a combination thereof. The optimal porosity of the fugitive tool can be dependent on the CTE match to the parent material, the pressure needed to densify the parent material, or both. The desired porosity can be about 2% to about 50%.

The fugitive tool can have sufficient compressive strength to resist the forces seen during densification. The fugitive tool's strength and/or the selected process pressure can be compatible so the fugitive tool is not crushed during the densification process.

Exemplary fugitive materials include forms of carbon that can be removed by burning out in air. One or more of these materials can be a good choice when the parent material can tolerate being heated in air to such a temperature as to remove the carbonaceous fugitive material. This typically requires a temperature of about 850° C. to burn these fugitive materials completely. The densification process can be carried out in an oxygen-free environment, and most forms of carbon (including the graphite used in conventional SPS tooling) can survive heating in an oxygen-free environment to very high temperatures, but will be consumed when fired in air having a temperature in the vicinity of 850° C. or greater. Use of such carbonaceous materials can allow for subsequent removal without the use of chemicals, provided that the parent material can tolerate firing in air to sufficient temperature to remove the carbonaceous tools.

Such carbonaceous fugitive materials can include any form of powdered, flaked, and/or fibered carbon-based fillers that can be cast, pressed, and/or otherwise formed in concert with a char-producing binder. When using such a fugitive material, the preformed part can be charred to produce carbon from the binder by firing above 400° C., such as between approximately 800° C. and approximately 1000° C., in an oxygen free environment. The fugitive structure then can be further densified as desired by a post-infusion and pyrolysis (PIP) process, where the charred solid is soaked in the same or a different char-producing binder and charred again. Using this method, a desired density can be obtained to match the needs of the fugitive tool. More strength can be achieved by repeating this processing to higher densities, but better crushability can be obtained by leaving the form more porous. Suitable binders can include sugars of any form, cross-linked polymers of any class of epoxies, urethanes, and/or phenolics, ideally having a high char content. The polymers can be thinned with a compatible solvent to achieve a desired solids loading to the form and/or to create an initial porosity that allows the charring to take place without undesired internal distress during pyrolysis. The polymers can be used, either thinned or un-thinned with solvent, to coat the carbon powders, which then can be subsequently dried and/or cold- and/or hot-pressed into the desired shape.

The carbonaceous fugitive materials may include any form of natural or synthetic graphite, any form of granular or flaked carbon, graphene, carbon fibers, carbon nanotubes, Buckminster fullerene, carbon nanobuds, glassy carbon, and combinations thereof. The fugitive materials can include additives which do not sinter.

Other fugitive materials include ceramics that can be leached and/or removed by a leachant such as water or a hot caustic solution. One group of such ceramic fugitive materials are silica-based ceramics similar to those used in investment casting, those ceramics comprising alumina, zircon, and/or cristobalite, where the ceramic is leachable and/or dissolvable in a hot caustic solution. A silica-based ceramic can be desired when the processing of the parent material will not exceed approximately 1650° C.

Fugitive tools can be fabricated by any available means typically used to form powdered parts into a 3-dimensional solid using a binder. These fabrication techniques can include: Tomo-Lithographic-Molding (TOMO™), vacuum casting, freeze casting, spin casting, powder coating, cold pressing, hot pressing, injection molding, and/or transfer molding, etc. A carbonaceous form can be made with a 3D-printed sugar form that can be loaded with carbonaceous powders that are then charred as described above to form carbonaceous structures. It is also contemplated that a binder alone can be used and charred to form the fugitive tool.

Exemplary parent materials include carbides, cermets, ceramics, metals, ceramic matrix composites, bioceramics, bismuth telluride based materials, skutterudite and other thermoelectric materials, metal matrix composites, and hybrid composites. Exemplary carbides include boron carbide, tantalum carbide, silicon carbide, tungsten carbide, zirconium carbide, chromium carbide, and combinations thereof. These parent material may have nanoscale morphology. For example, the parent material may comprise particles (including fibers) with an average diameter less than or equal to 100 nanometers. Combinations of materials are contemplated including the combination of nanoscale materials with non-nanoscale materials.

It is further contemplated that the fugitive materials and tools described herein may also be used in other densification processes such as vacuum hot pressing, microwave vacuum sintering, and hot isostatic pressing.

Turning now to the Figures, FIG. 1 shows parent material 10 disposed between fugitive tools 20. The parent material and fugitive tools are located within non-fugitive punch 30 and die 40 which are connected to an electromechanical system 50. The electromechanical system can be an SPS electromechanical system.

Figure 2:
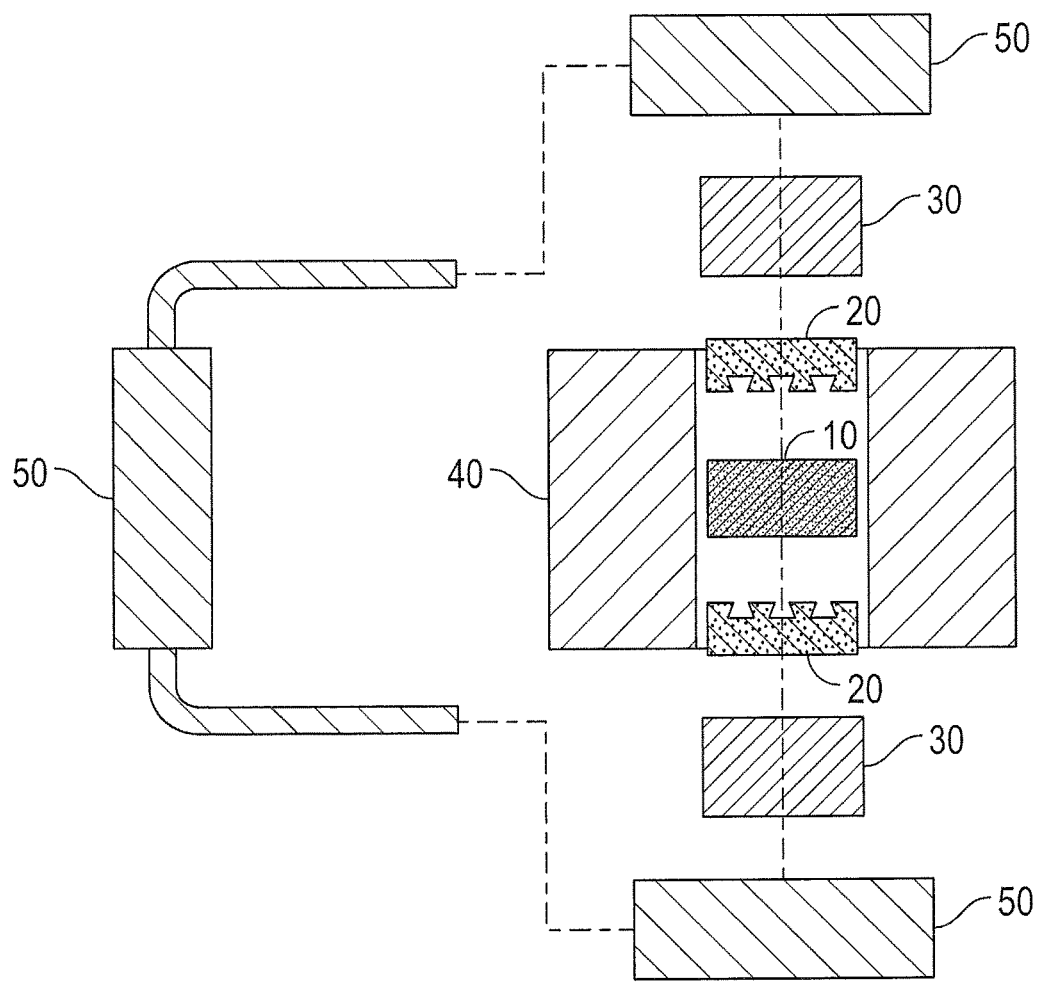
FIG. 2 is a cross section of a densification apparatus using a fugitive tool.
Figure 3:
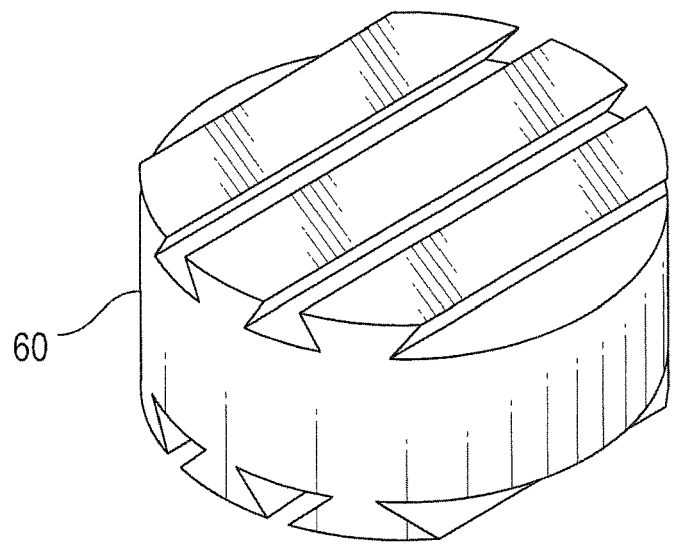
FIG. 3 is an exemplary article made by the method described herein.

FIG. 2 shows a cut away schematic of the apparatus shown in FIG. 1. FIG. 3 shows the part 60 made in the apparatus shown in FIGS. 1 and 2.

Figure 4:
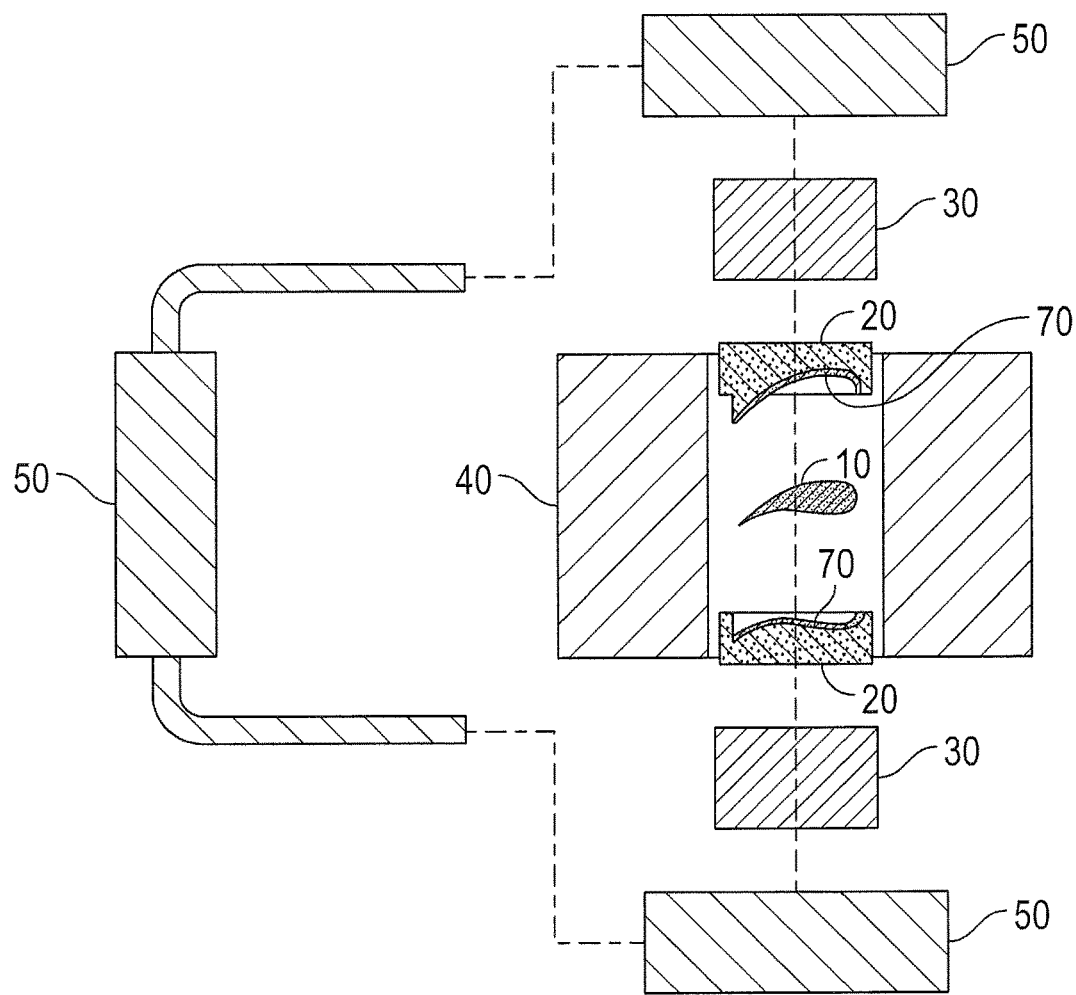
FIG. 4 is a cross section of a densification apparatus using a fugitive tool with a coating.

FIG. 4 shows parent material 10 disposed between fugitive tools 20. The parent material and fugitive tools are located within non-fugitive punch 30 and die 40 which are connected to an SPS electromechanical system 50. Fugitive tools 20 has a coating 70 in an area that will contact the parent material 10.

Figure 5:
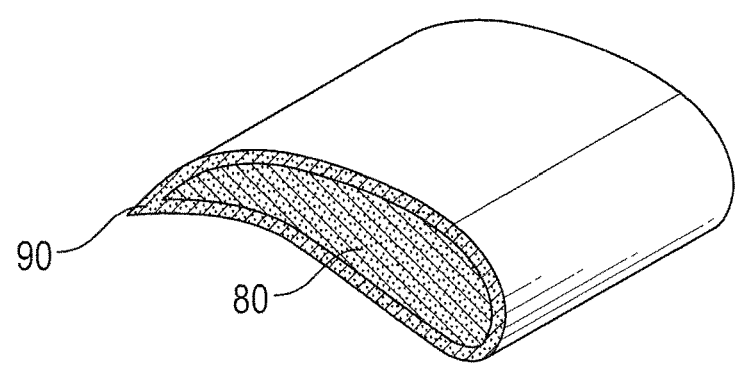
FIG. 5 is an exemplary article having a coating made by the method described herein.

FIG. 5 shows article 80 formed from the parent material 10 shown in FIG. 4 and having coating 90. It is contemplated that the coating material 70 deposited on the fugitive tool 20 may undergo a physical or chemical change during the densification process resulting in a coating 90 on article 80 which is derived from coating 70. It is also contemplated that the coating 70 may not undergo any substantive change.

Figure 6:
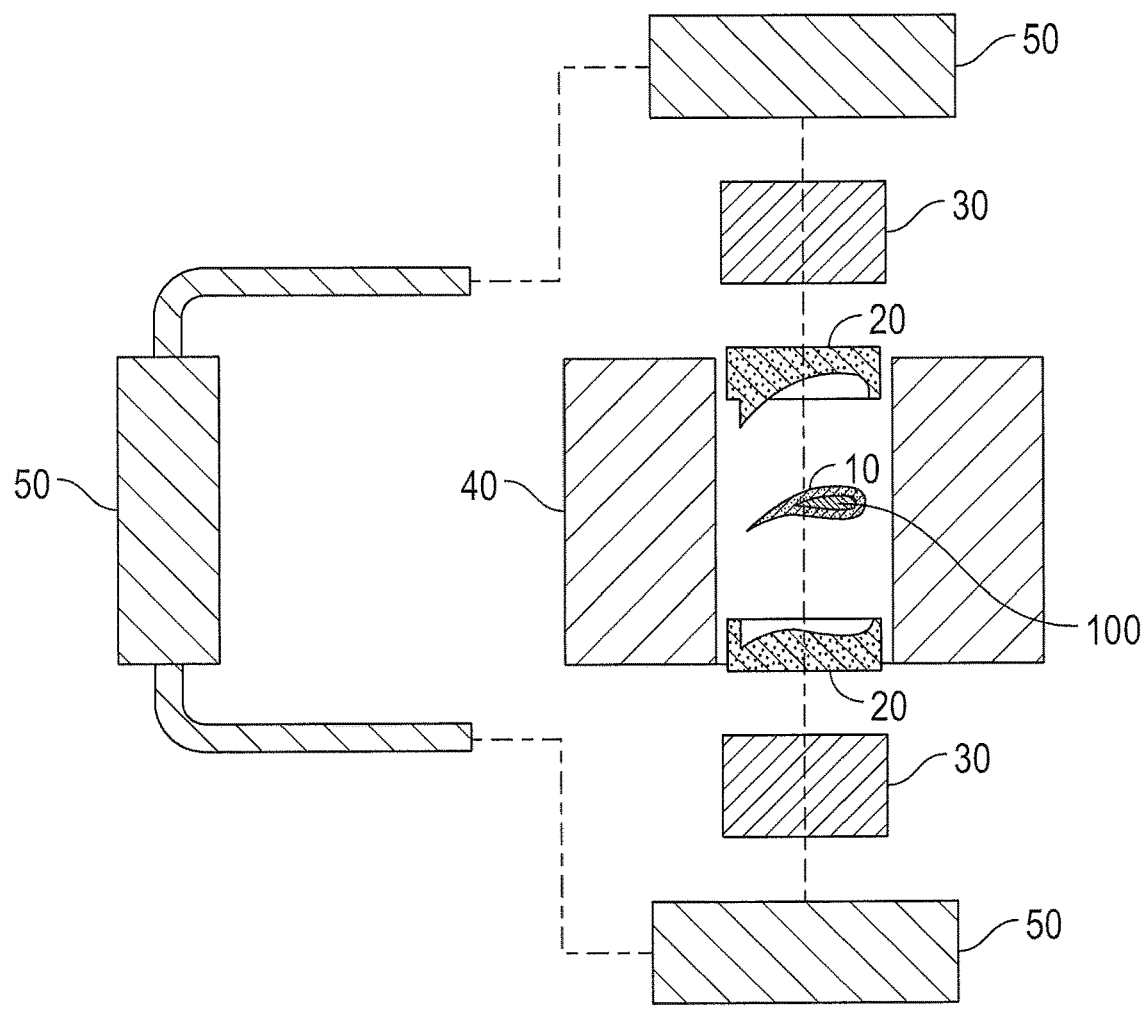
FIG. 6 is a cross section of a densification apparatus using both an interior and exterior fugitive tool.

FIG. 6 shows parent material 10 disposed between fugitive tools 20. Interior fugitive tool 100 is located within the parent material 10. The parent material and fugitive tools are located within non-fugitive punch 30 and die 40 which are connected to an SPS electromechanical system 50.

Figure 7:
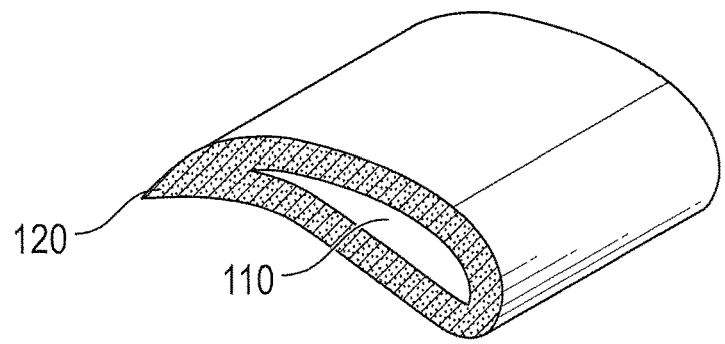
FIG. 7 shows the article formed with the interior fugitive tool shown in FIG. 6.

FIG. 7 shows the article 120 formed with the apparatus shown in FIG. 6 and having interior space 110.

When locating an interior fugitive part inside a powder bed, a loading sleeve may be used. A loading sleeve is a non-fugitive tool that has matching inner dimensions to the main SPS die tool. The loading sleeve has a slot on the top that is used to fill the powder when all the fugitive tools are in correct position inside the tube. The fugitive tool(s) are loaded into the tube and held with pins such that the cavity for the part shape is exposed from the top through this slot. The starting position of the fugitive tool(s) within this sleeve is adjusted to account for material densification. The pins used to contact and locate the inner fugitive may be inside the powder and are kept small in diameter as they will leave a cavity in the powder pack when removed. That small pin cavity will be closed up during densification. Any number of pins can be used, but typically 2-4 pins for each fugitive tool component.

The parent material may be blended with a high energy blending system such as a high energy ball mill or centrifugal mixer to achieve good dispersion and cast into the cavity as uniformly as possible. This reduces stress on the inner fugitive during compression and keeps the location of the inner fugitive tool accurate. The powders can be blended wet or dry. Vibration, and/or vacuum may be used to enhance the filling of the powder completely and uniformly into the complex cavity. The pins are then removed and the fugitive tool(s) and packed powder are then pressed into the non-fugitive SPS die.

Figure 8:
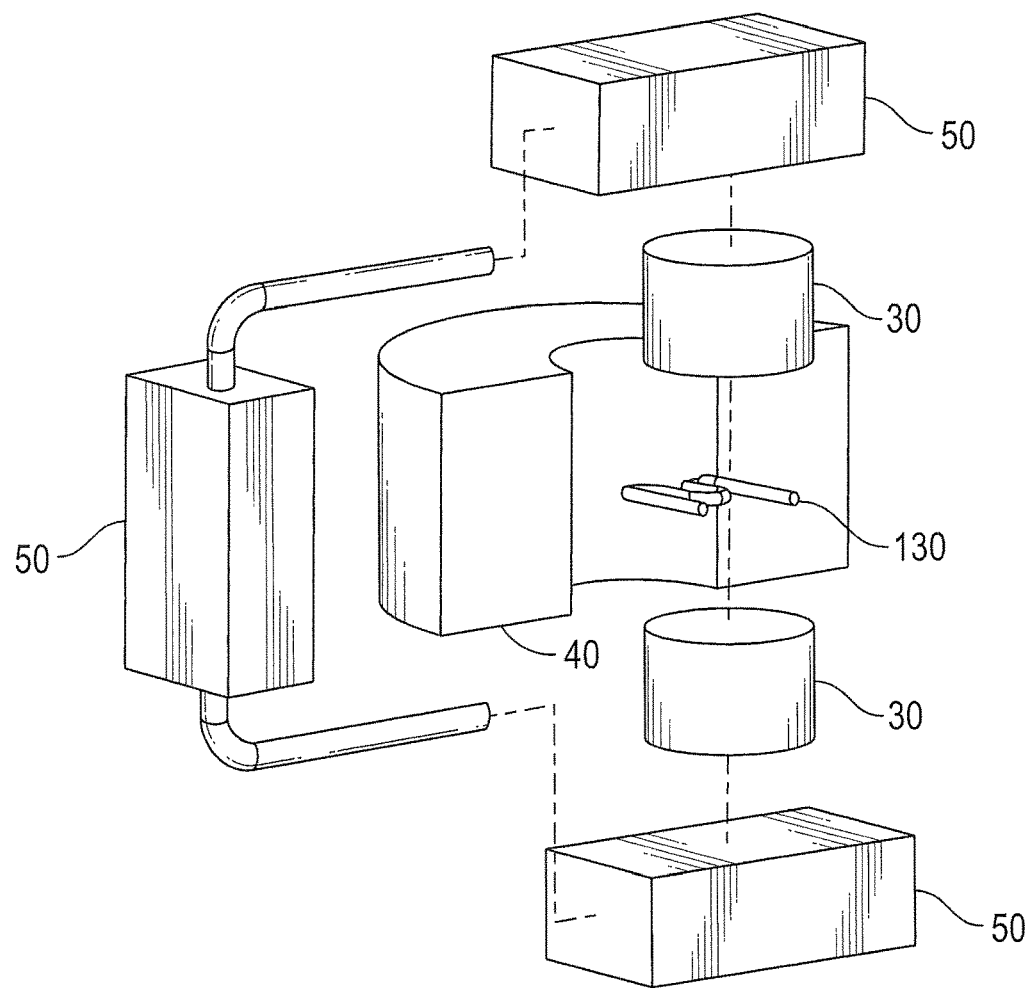
FIG. 8 is an exploded view of a densification apparatus using an interior fugitive tool.
Figure 9:
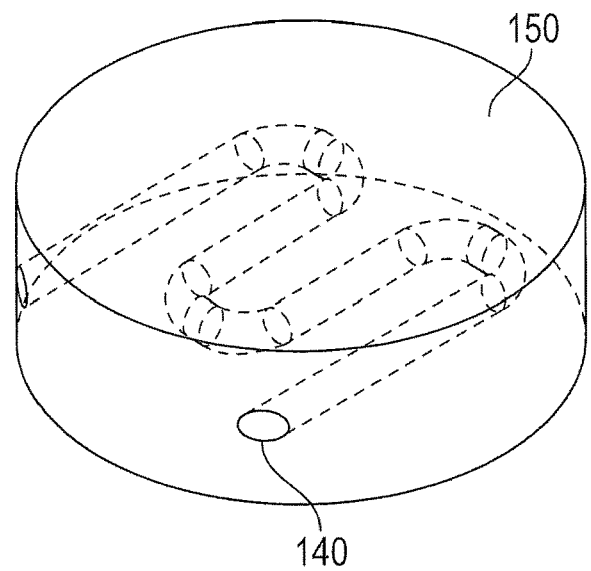
FIG. 9 shows the article formed with the interior fugitive tool shown in FIG. 8.

FIG. 8 shows a fugitive tool 130 disposed between non-fugitive punch 30. In this embodiment no exterior fugitive tool is employed. The fugitive tool is disposed within parent material (not shown). FIG. 9 shows the part 150 having a space 140 in the shape of fugitive tool 130 embedded in the densified parent material.

Figure 10:
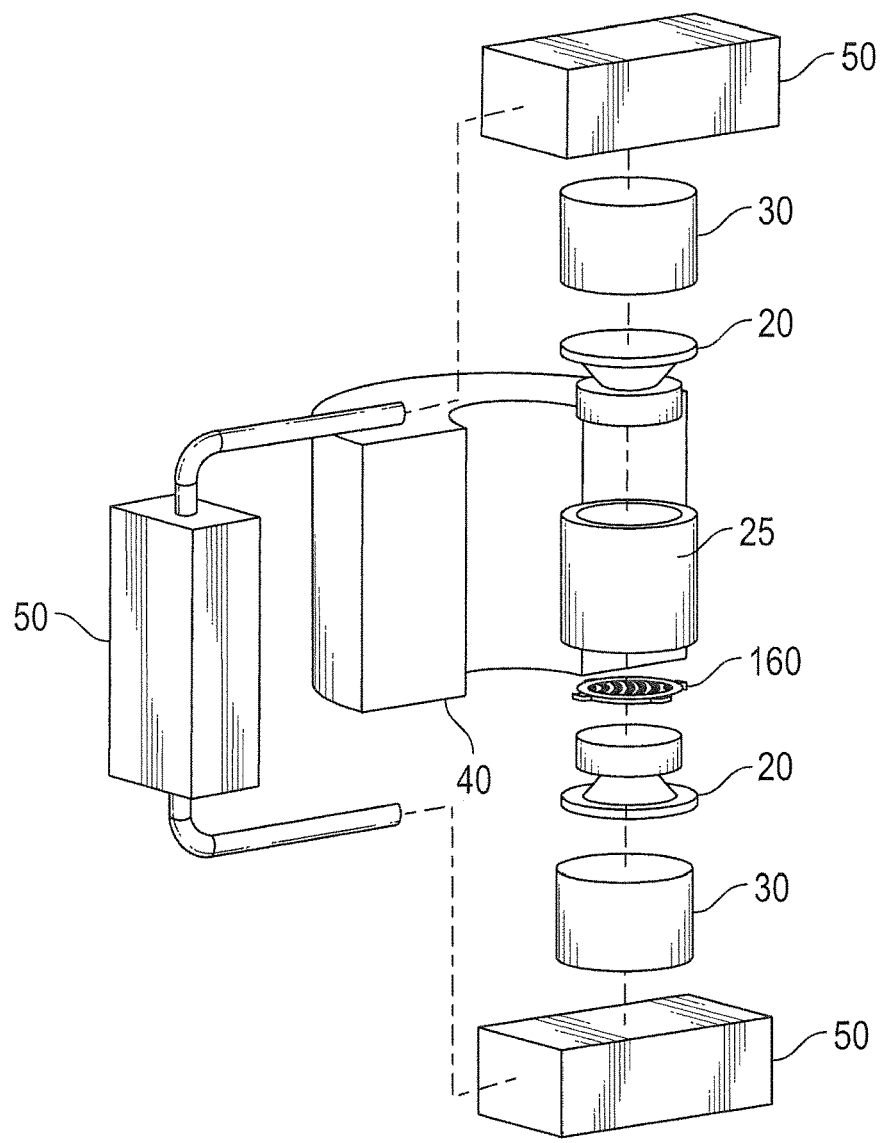
FIG. 10 is an exploded view of a densification apparatus using a fugitive tool and a preformed component.
Figure 11:
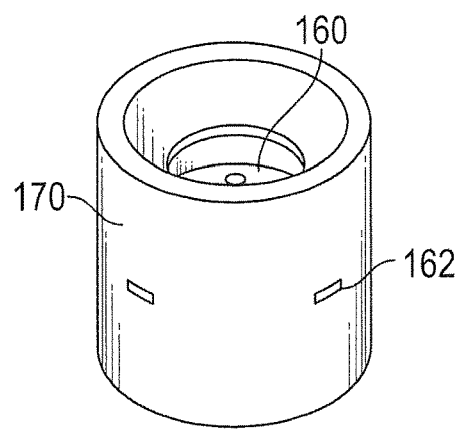
FIG. 11 shows the article formed with an interior preformed component.

FIG. 10 shows an embodiment of locating a premade component. Premade component 160 is disposed between fugitive tool 20 and within fugitive tool 25. Parent material (not shown) is added within fugitive tool 25 and fugitive tool 20 provides interior shape and features. This results in the part 170 shown in FIG. 11 which has premade component 160 located within the densified material. Premade component 160 is shown with optional locating tabs 162.

The methods discussed herein are further described by the following non-limiting examples.

EXAMPLES

Example 1

A test part was created by embedding a solid graphite threaded rod in a powdered metal bed. The powdered metal was densified by SPS. The graphite rod (the fugitive tool) was then exposed and removed by burning in air. The test part was cut open and the interior showed threading, reflecting the threading of the fugitive tool.

Example 2

To create a second test part the same procedure was used except using a formed fired silica-based component such as would be used for an investment casting core as the fugitive material. The fugitive tool was a simple flat bar with a hole in the center, aligned in the pressing direction. After SPS densification the fugitive tool was exposed by grinding an end and removed by caustic leach. The test part was cut open and the interior showed the filled hole of the fugitive tool.

Example 3

Example 2 was successfully repeated with a thicker silica fugitive tool.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of forming an article comprising:
contacting a porous fugitive tool comprising a carbonaceous material, a silica based ceramic, or a ceramic comprising alumina, zircon and/or cristobalite with a powdered parent material; densifying the powdered material; and destructively removing the porous fugitive tool, wherein densifying employs spark plasma sintering (SPS) and destructively removing the tool comprises burning in air or leaching with a hot caustic solution;
wherein the parent material has nanoscale morphology.

2. The method of claim 1, wherein the porous fugitive tool is embedded in the powdered parent material.

3. The method of claim 1, further comprising placing the porous fugitive tool in contact with a non-fugitive tool.

4. A method of forming a coating comprising applying a coating material to a porous fugitive tool comprising a carbonaceous material, a silica based ceramic, or a ceramic comprising alumina, zircon and/or cristobalite; placing powdered parent material in contact with the coating material on the porous fugitive tool; densifying the powdered parent material and destructively removing the porous fugitive tool, wherein densifying employs spark plasma sintering (SPS) and destructively removing the tool comprises burning in air or leaching with a hot caustic solution;
wherein the parent material has nanoscale morphology.

5. The method of claim 4, wherein the porous fugitive tool is embedded in the powdered parent material.

6. The method of claim 4, further comprising placing the porous fugitive tool in contact with a non-fugitive tool.

7. The method of claim 4, wherein the coating imparts catalytic reactivity to the surface of the densified parent material.

8. A method of locating an interior component comprising contacting a component with a porous fugitive tool comprising a carbonaceous material, a silica based ceramic, or a ceramic comprising alumina, zircon and/or cristobalite; placing the porous fugitive tool in a non-fugitive tool; placing powdered parent material in contact with the porous fugitive tool; densifying the powdered parent material and destructively removing the porous fugitive tool wherein densifying employs spark plasma sintering (SPS) and destructively removing the tool comprises burning in air or leaching with a hot caustic solution.

9. The method of claim 8, wherein the porous fugitive tool is embedded in the powdered parent material.

10. The method of claim 8, further comprising placing the porous fugitive tool in contact with the non-fugitive tool.

11. The method of claim 8, wherein the parent material has nanoscale morphology.

* * * * *